United States Patent
Bevis

(10) Patent No.: US 12,251,280 B2
(45) Date of Patent: Mar. 18, 2025

(54) SYSTEM FOR DETERMINING A BRUSHING ANGLE OF AN ORAL CARE DEVICE

(71) Applicant: KONINKLIJKE PHILIPS N.V., Eindhoven (NL)

(72) Inventor: Taylor Bevis, Bothell, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 447 days.

(21) Appl. No.: 17/619,840

(22) PCT Filed: Jun. 19, 2020

(86) PCT No.: PCT/EP2020/067074
§ 371 (c)(1),
(2) Date: Dec. 16, 2021

(87) PCT Pub. No.: WO2020/254561
PCT Pub. Date: Dec. 24, 2020

(65) Prior Publication Data
US 2022/0304785 A1  Sep. 29, 2022

Related U.S. Application Data

(60) Provisional application No. 62/864,587, filed on Jun. 21, 2019.

(51) Int. Cl.
| | | |
|---|---|---|
| A61C 17/22 | (2006.01) | |
| A46B 15/00 | (2006.01) | |
| A61C 17/34 | (2006.01) | |

(52) U.S. Cl.
CPC ........ *A61C 17/221* (2013.01); *A46B 15/0006* (2013.01); *A46B 15/0012* (2013.01); *A61C 17/3481* (2013.01); *A46B 2200/1066* (2013.01)

(58) Field of Classification Search
CPC ............ A46B 15/0004; A46B 15/0006; A46B 15/0002; A46B 2200/1066; A46B 15/0012; A61C 17/3481; A61C 17/221
(Continued)

(56) References Cited

U.S. PATENT DOCUMENTS

| | | |
|---|---|---|
| 10,105,202 B2 | 10/2018 | Johnson et al. |
| 11,051,609 B2 | 7/2021 | Boere et al. |

(Continued)

FOREIGN PATENT DOCUMENTS

CN 107928099 A 4/2018

OTHER PUBLICATIONS

International Search Report and Written Opinion Dated Sep. 4, 2020 For International Application No. PCT/EP2020/067074, Filed Jun. 19, 2020.

*Primary Examiner* — Katina N. Henson

(57) ABSTRACT

A method (300) for determining a brushing angle of an oral care device (10) is provided. The method includes the steps of: generating (310), by a controller (30) of the oral care device, a drive signal to move a drive train (24) and produce a motion of a bristle field (18) of the oral care device; measuring (320), via a sensor (28), force applied by a user to the bristle field of the oral care device; and determining (330), by the controller of the oral care device, a brushing angle of the bristle field relative to a surface of the user's oral cavity based at least in part on the generated drive signal and the measured force to the bristle field.

19 Claims, 6 Drawing Sheets

(58) Field of Classification Search
USPC .......................................................... 15/105
See application file for complete search history.

(56) References Cited

U.S. PATENT DOCUMENTS

| | | |
|---|---|---|
| 2011/0010875 A1 | 1/2011 | Wahori et al. |
| 2011/0010876 A1 | 1/2011 | Wahori et al. |
| 2012/0251975 A1 | 10/2012 | Wahori |
| 2012/0310593 A1 | 12/2012 | Bates et al. |
| 2015/0297327 A1* | 10/2015 | Miller ................ A46B 15/0012 15/22.1 |
| 2017/0319311 A1* | 11/2017 | Luettgen ............ A46B 15/0012 |
| 2018/0352947 A1 | 12/2018 | Hardeman et al. |
| 2019/0015182 A1* | 1/2019 | Johnson .................. A46B 9/04 |

* cited by examiner

```
┌─────────────────────────────────────────────────────────────┐
│ Generating, by a controller of the oral care device, a      │
│ drive signal to move a drive train and produce a motion of  │
│ a bristle field of the oral care device                     │
│ 310                                                         │
└─────────────────────────────────────────────────────────────┘
                              ↓
┌─────────────────────────────────────────────────────────────┐
│ Measuring, via a sensor, force applied by a user to the     │
│ bristle field of the oral care device                       │
│ 320                                                         │
└─────────────────────────────────────────────────────────────┘
                              ↓
┌─────────────────────────────────────────────────────────────┐
│ Determining, by the controller of the oral care device, a   │
│ brushing angle of the bristle field relative to a surface   │
│ of the user's oral cavity based at least in part on the     │
│ generated drive signal and the measured force to the        │
│ bristle field                                               │
│ 330                                                         │
└─────────────────────────────────────────────────────────────┘
                              ↓
┌─────────────────────────────────────────────────────────────┐
│ Generating a feedback regarding the determined brushing     │
│ angle                                                       │
│ 340                                                         │
└─────────────────────────────────────────────────────────────┘
                              ↓
┌─────────────────────────────────────────────────────────────┐
│ Communicating the generated feedback                        │
│ 350                                                         │
└─────────────────────────────────────────────────────────────┘
                              ↓
┌─────────────────────────────────────────────────────────────┐
│ Notifying the user when the determined brushing angle is    │
│ less than a first predetermined threshold or greater than   │
│ a second predetermined threshold                            │
│ 360                                                         │
└─────────────────────────────────────────────────────────────┘
```

SYSTEM FOR DETERMINING A BRUSHING ANGLE OF AN ORAL CARE DEVICE

This application is the U.S. National Phase application under 35 U.S.C. § 371 of International Application No. PCT/EP2020/067074, filed on Jun. 19, 2020, which claims the benefit of U.S. Application Ser. No. 62/864,587, filed Jun. 21, 2019. These applications are hereby incorporated by reference herein.

FIELD OF THE INVENTION

The present disclosure relates generally to methods and systems for determining a brushing angle of an oral care device during a brushing session by a user.

BACKGROUND

In preventative oral care, user technique is a primary determinant of efficacy of removing harmful biofilms from teeth. As is generally known to dental professionals, an angle of 45° between the bristle field and a user's gum line is optimal. However, many people in the general public remain unaware of this optimal brushing angle. Even for users who are aware of this optimal brushing angle, it is difficult for the user to self-assess if they are actually brushing their teeth in this recommended manner.

Further, measuring brushing angle in oral care devices, such as power toothbrushes, is challenging because such measurements typically require hardware for locating, identifying, and measuring a user's gum line and teeth angle and orientation, for example, using cameras, proximity sensors, or contact sensors, which are generally bulky and expensive.

Accordingly, there is a need in the art for improved methods and systems for determining the brushing angle of an oral care device.

SUMMARY OF THE INVENTION

The present disclosure is directed to methods and systems for determining a brushing angle of an oral care device relative to a surface (e.g., gum line) in a user's oral cavity. Various embodiments and implementations herein are directed to an oral care device, such as power toothbrush, driven by a periodic signal (e.g., sine, square, sawtooth waveform). A sensor measures the force applied in a normal direction to the bristle field. Characteristics of the measured force (e.g., amplitude, frequency, phase) and the driving signal characteristics (e.g., amplitude, frequency, phase) are combined via a transfer function. The transfer function utilizes a change in the ratio of characteristics between load and driving signal as brushing angle changes. The single-axis force measurement enables resolution of brushing angle by direct contact with dental surfaces, and the orientation of the user's gum line does not need to be measured directly.

Generally in one aspect, a method for determining a brushing angle of an oral care device is provided. The method includes the steps of: generating, by a controller of the oral care device, a drive signal to move a drive train and produce a motion of a bristle field of the oral care device; measuring, via a sensor, force applied by a user to the bristle field of the oral care device; and determining, by the controller of the oral care device, a brushing angle of the bristle field relative to a surface of the user's oral cavity based at least in part on the generated drive signal and the measured force to the bristle field.

Implementations may include one or more of the following. The sensor may comprise a load sensor or pressure sensor. The determining step can include applying characteristics of the measured force and characteristics of the generated drive signal via a transfer function. The transfer function can be based on a change in phase difference or a change in spectral energy density.

In some implementations, the method can include the step of generating a feedback regarding the determined brushing angle of the bristle field relative to the surface of the user's oral cavity. The method can also include the step of communicating the generated feedback. The method can further include the step of notifying the user when the determined brushing angle the oral care device is less than a first predetermined threshold or greater than a second predetermined threshold.

Generally in another aspect, an oral care device is provided. The device includes: a brush head including a bristle field; a drive train responsive to a drive signal and configured to produce a motion of the bristle field; a sensor configured to measure force applied by a user to the bristle field; and a controller configured to: (i) generate a drive signal to move the drive train and produce a motion of the bristle field; and (ii) determine a brushing angle of the bristle field relative to a surface of the user's oral cavity based at least in part on the generated drive signal and the measured force to the bristle field.

Implementations may include one or more of the following. The sensor may comprise a load sensor or pressure sensor. The controller may be configured to apply characteristics of the measured force and characteristics of the generated drive signal via a transfer function. The transfer function can be based on a change in phase difference or a change in spectral energy density. The controller may be configured to generate a feedback regarding the determined brushing angle of the bristle field relative to the surface of the user's oral cavity. The controller may be configured to communicate the generated feedback.

As used herein for purposes of the present disclosure, the term "controller" is used generally to describe various apparatus relating to the operation of an oral care device. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present disclosure discussed herein. The terms "program" or "computer program" are used herein in a generic sense to refer to any type of computer code (e.g., software or microcode) that can be employed to program one or more processors or controllers.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the implementation(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 8 is a flowchart of a method for determining a brushing angle of an oral care device according to the present disclosure.

DETAILED DESCRIPTION

The present disclosure is directed to methods and systems for determining a brushing angle of an oral care device relative to a surface (e.g., gum line) in a user's oral cavity. More generally, Applicant has recognized and appreciated that it would be beneficial to provide an oral care device that determines a brushing angle of the device relative to a surface of a user's oral cavity based at least in part on a generated drive signal and the applied force to the bristle field of the oral care device. Accordingly, the methods and systems described or otherwise envisioned herein provide an oral care device, such as power toothbrush, driven by a periodic signal (e.g., sine, square, sawtooth waveform). A sensor measures the force applied in a normal direction to the bristle field. Characteristics of the measured force (e.g., amplitude, frequency, phase) and the driving signal characteristics (e.g., amplitude, frequency, phase,) are combined via a transfer function. The transfer function utilizes a change in the ratio of characteristics between load and driving signal as brushing angle changes. The single-axis force measurement enables resolution of brushing angle by direct contact with dental surfaces, and the orientation of the user's gum line does not need to be measured directly The embodiments and implementations disclosed or otherwise envisioned herein can be utilized with any oral care device. Examples of suitable oral care devices include a toothbrush such as a Philips Sonicare® toothbrush (manufactured by Koninklijke Philips Electronics, N.V.), or other power toothbrushes. However, the disclosure is not limited to these enumerated devices, and thus the disclosure and embodiments disclosed herein can encompass any oral care device.

Figure 1:
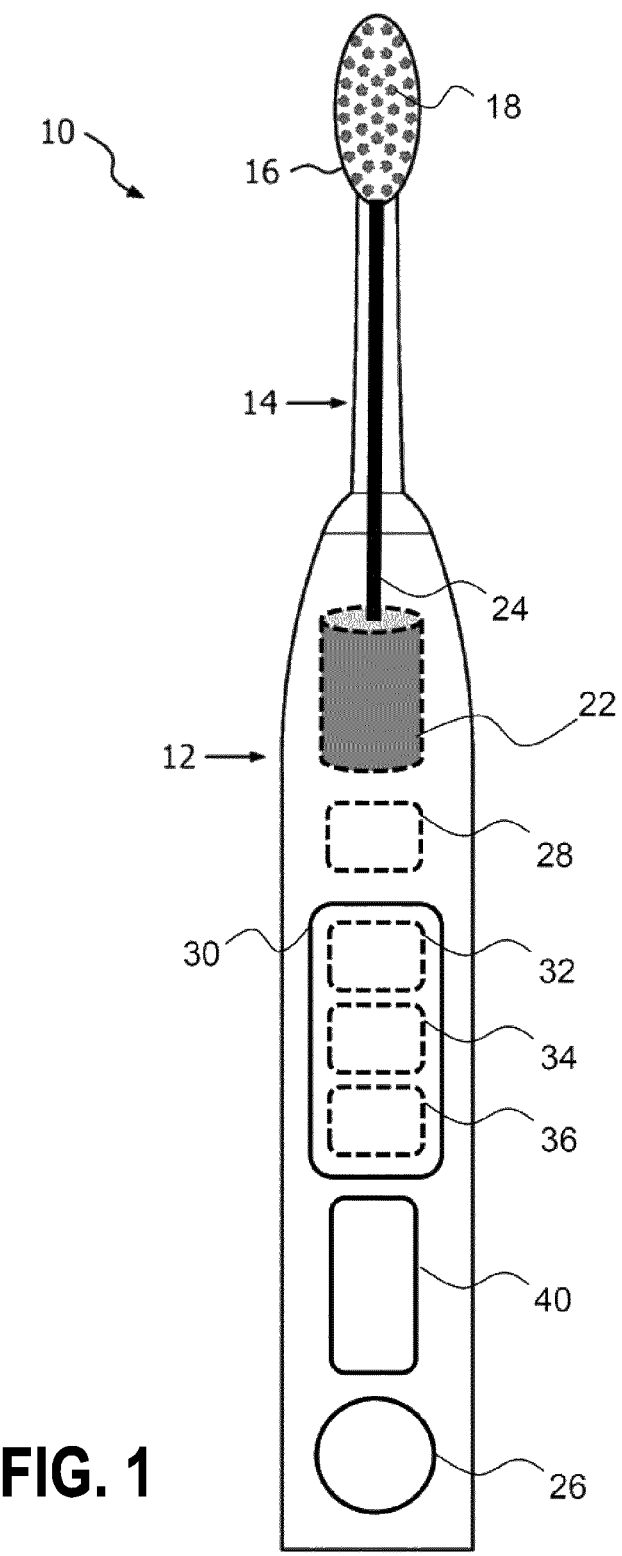
FIG. 1 is a schematic representation of an oral care device according to the present disclosure.

Referring to FIG. 1, in one embodiment, an oral care device 10 is provided that includes a handle or body portion 12 and a brush head 14. Brush head member 14 includes at its end remote from the body portion a brush head 16 comprising a bristle field 18. The body portion 12 typically comprises a housing, at least a portion of which is hollow, to contain components of the personal care device. According to an embodiment, brush head 14 is mounted so as to be able to move relative to the body portion 12. The movement can be any of a variety of different movements, including vibrations or rotation, among others.

The body portion 12 includes a drivetrain assembly with a motor 22 for generating movement, and a transmission component or drivetrain 24, for transmitting the generated movements to brush head 14. For example, the drivetrain comprises a motor or electromagnet(s) 22 that generates movement of a drivetrain 24, which is subsequently transmitted to the brush head member 14, brush head 16, and/or bristle field 18. The drivetrain can include components such as a power supply, an oscillator, and one or more electromagnets, among other components. In this embodiment, the power supply comprises one or more rechargeable batteries, not shown, which can, for example, be electrically charged in a charging holder in which oral care device 10 is placed when not in use. According to one embodiment, brush head member 14 is mounted to the drivetrain 24 so as to be able to vibrate relative to body portion 12. The brush head member 14 can be fixedly mounted onto drive train 24, or it may alternatively be detachably mounted so that brush head member 14 can be replaced with a different brush head member for different operating features, or when the bristles or another component of the brush head are worn out and require replacement. Body portion 12 is further provided with a user input 26 to activate and de-activate the drivetrain. The user input 26 allows a user to operate the oral care device 10, for example to turn the device on and off. The user input 26 may, for example, be a button, touch screen, or switch.

The oral care device 10 includes controller 30 for creating a drive signal to move the drive train 24 and produce a motion of the brush head member 14, brush head 16, and/or bristle field 18. The drive signal is typically a square wave, which in one cycle rises from a zero level to a positive value and after a time determined by the drive frequency declines to a value of opposing polarity, which drive signal cycle continues for the duration of operation of the toothbrush for each event. The frequency and amplitude may be varied, depending on the controller, drive train and other components used.

The oral care device 10 includes one or more sensors 28. Sensor 28 is shown in FIG. 1 within body portion 12, but may be located anywhere within the device, including for example within brush head member 14 or brush head 16. The sensors 28 can comprise, for example, a load sensor or pressure sensor configured to measure the load or pressure exerted against the brush head member 14, brush head 16, and/or bristle field 18. The sensor 28 is configured to generate information indicative of the load or pressure exerted (i.e. structural or mechanical force or stress) against the brush head member 14, brush head 16, and/or bristle field 18. The load sensor or pressure sensor can be, for example, a switch, a gauge, or another component. As one example, the sensor is a Hall-effect sensor which responds to a changing magnetic field as the brush head member 14, brush head 16, and/or bristle field 18 moves in response to pressure. The Hall-effect sensor determines lateral displacement of the brush head member 14, brush head 16, and/or bristle field 18 due to force on the bristles against the teeth. Many different types of load or pressure sensors could be utilized, as described or otherwise envisioned herein.

Sensor data generated by sensor 28 is provided to a controller 30. According to an embodiment, sensor 28 is integral to controller 30. Controller 30 may be formed of one or multiple modules, and is configured to operate the personal care device 10 in response to an input, such as input obtained via user input 26. Controller 30 can comprise, for example, a processor 32 and a memory 34. Processor 32 may take any suitable form, including but not limited to a microcontroller, multiple microcontrollers, circuitry, a single processor, or plural processors. Memory 34 can take any suitable form, including a non-volatile memory and/or RAM. The non-volatile memory may include read only memory (ROM), a hard disk drive (HDD), or a solid state drive (SSD). The memory can store, among other things, an operating system. The RANI is used by the processor for the temporary storage of data. According to an embodiment, an operating system may contain code which, when executed by controller 30, controls operation of the hardware components of oral care device 10. According to an embodiment, connectivity module 36 transmits collected sensor data, and can be any module, device, or means capable of transmitting a wired or wireless signal, including but not limited to a Wi-Fi, Bluetooth, near field communication, and/or cellular module.

According to an embodiment, oral care device 10 can comprise a user interface 40 configured to provide information to a user before, during, and/or after a cleaning session. The user interface 40 can take many different forms, but is configured to provide information to a user. For example, the information can be read, viewed, heard, felt, and/or otherwise interpreted concerning the cleaning session. According to an embodiment, user interface 40 provides feedback to the user, such as a guided cleaning session, that includes information about the brushing angle of the oral care device relative to the user's gum line. Accordingly, the user interface may be a display that provides information to the user, a haptic mechanism that provides haptic feedback to the user, a speaker to provide sounds or words to the user, or any of a variety of other user interface mechanisms. According to an embodiment, controller 30 of oral care device 10 receives information from sensor 28, assesses and analyzes that information, and provides information that can be displayed to the user via user interface 40.

Figure 2:
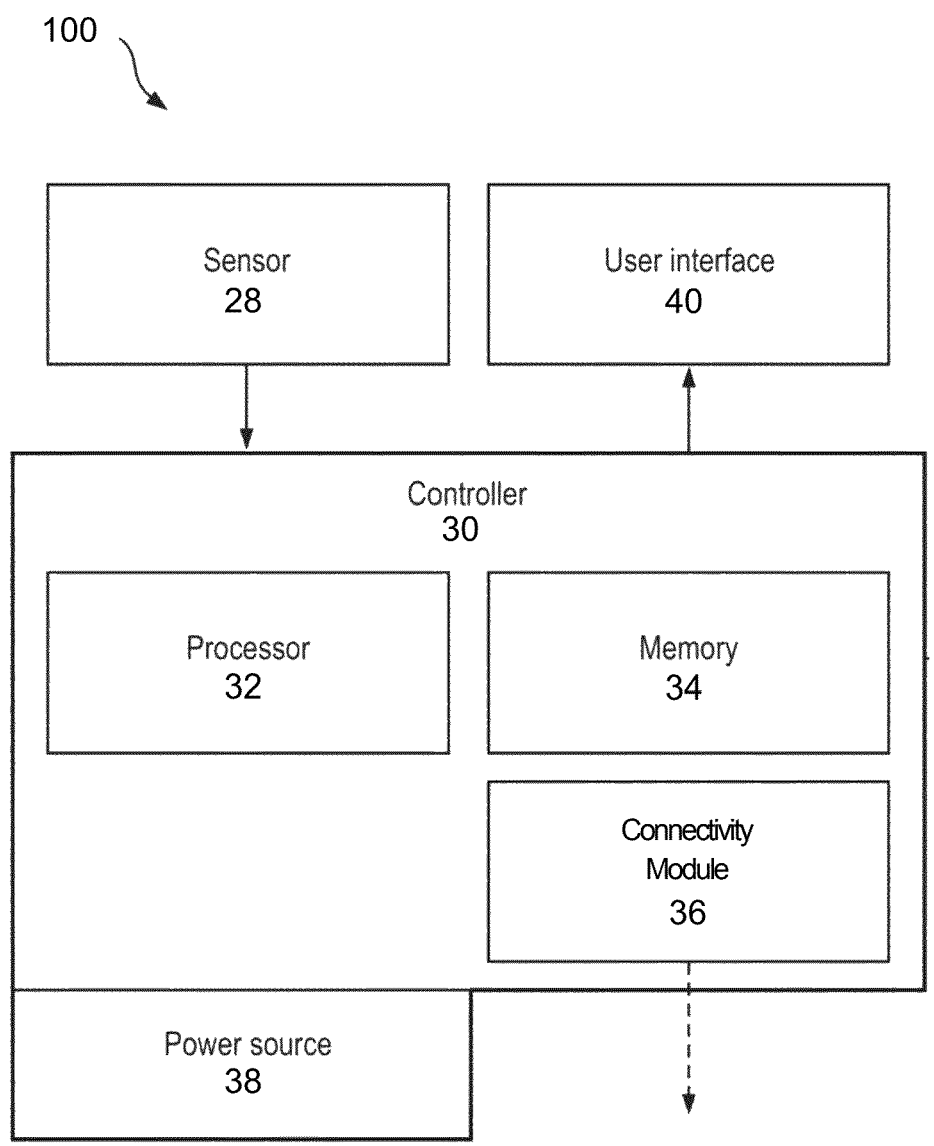
FIG. 2 is a schematic representation of a control system of an oral care device according to the present disclosure.

Referring to FIG. 2, in one embodiment, a schematic representation of the control system 100 of oral care device 10 is provided. The control system 100 of oral care device 10 comprise a controller 30 with a processor 32 and a memory 34, which can store an operating system as well as sensor data. The device also comprises a power source 38 which can be AC power, or can be battery power from a rechargeable battery. The control system 100 further comprises a user interface 40, which is configured to transmit or receive information to the user. The sensor 28 of the system, which may be an load sensor or pressure sensors, generates sensor data indicative of the load or pressure exerted against the brush head member 14, brush head 16, and/or bristle field 18 and communicates that data to controller 30.

Connectivity module 36 of the device can be configured and/or programmed to transmit sensor data to a wireless transceiver (not shown). For example, connectivity module 36 may transmit sensor data via a Wi-Fi connection over the Internet or an Intranet to a dental professional, a database, or other location. Alternatively, connectivity module 36 may transmit sensor or feedback data via a Bluetooth or other wireless connection to a local device (e.g., a separate computing device), database, or other transceiver. For example, connectivity module 36 allows the user to transmit sensor data to a separate database to be saved for long-term storage, to transmit sensor data for further analysis, to transmit user feedback to a separate user interface, or to share data with a dental professional, among other uses. Connectivity module 36 may also be a transceiver that can receive user input information, including the above referenced standards (as should be appreciated by a person of ordinary skill in the art in conjunction with a review of this disclosure). Other communication and control signals described herein can be effectuated by a hard wire (non-wireless) connection, or by a combination of wireless and non-wireless connections.

According to an embodiment, control system 100 of oral care device 10 can programmed and/or configured to determine the brushing angle of an oral care device relative to a surface (e.g., gum line) in a user's oral cavity. As discussed herein, the information or data analyzed or used by control system 100 of oral care device 10 to carry out the functions and methods described herein can be generated by the one or more sensors 28. For example, controller 30 can be programmed and/or configured to effectuate to determine a brushing angle of the bristle field 18 of oral care device 10 relative to a surface of the user's oral cavity based at least in part on a drive signal of oral care device 10 and the measured force to the bristle field 18.

Sensor 28 can be any of the sensors described or otherwise envisioned herein, and can be programmed and/or configured to obtain sensor data regarding one or more aspects of load or force applied by the user to the brush head member 14, brush head 16, and/or bristle field 18 during a brushing session. Controller 30 can receive the sensor data from sensor 28 in real-time or periodically. For example, sensor 28 may send a constant stream of sensor data to controller 30 for storage and/or analysis, or may temporarily store and aggregate or process data prior to sending it to controller 30. Once received by controller 30, the sensor data can be processed by processor 32.

The methods and systems disclosed herein can advantageously determine a brushing angle of the oral care device 10 from a single axis force measurement by using known drive signal properties. In one embodiment, the drive train 24 in the oral care device 10 is driven by a known periodic signal (e.g., sine, square, sawtooth waveform). A sensor 28 measures the force applied in a normal direction to the bristle field 18. Optimally, the applied load may be sampled at a sufficiently high rate to capture at least the second harmonic of the drive signal above its Nyquist frequency. The controller 30 determines the brushing angle using a transfer function, such as a phase difference or a frequency difference, by applying characteristics of the drive signal (e.g., amplitude, frequency, phase) and characteristics of the measured force (e.g., amplitude, frequency, phase). Accordingly, the controller 30 can leverage a predictable change in the ratio of characteristics between load and driving signal as brushing angle changes.

Figure 3:
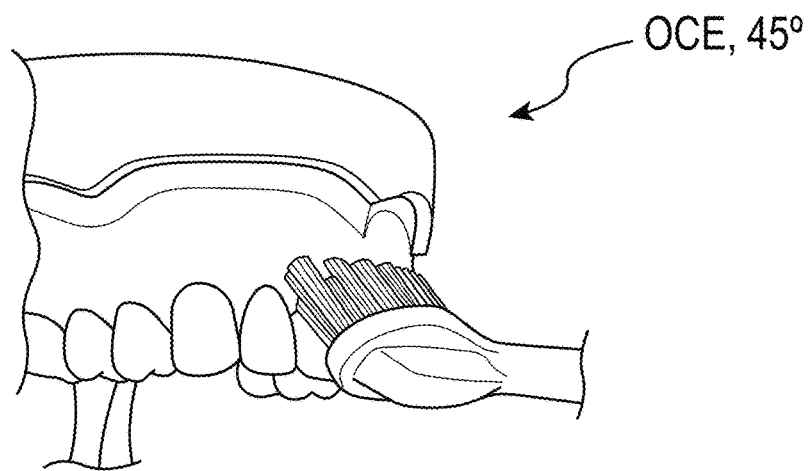
FIG. 3 is a photograph of an oral cavity environment with a brush head oriented at a 45° angle relative to the gum line of the oral cavity.

To illustrate the mechanism of the present disclosure, two example scenarios will be discussed: a desired 45° orientation with respect to a user's gum line, and a flat orientation of 0° angle (90° is an equivalent description). In a first example scenario, the brush head is oriented by the user as shown in FIG. 3 at the center of rotation (same position it would be in if the oral care device was off). When the oral care device is operational, the applied pressure will contain a time-varying cyclical component due to a change in the amount of bristles and tufts in the bristle field in contact with a user's teeth and gums as a function of position. When oriented as shown in FIG. 3, the pressure is highest when the brush head is rotated toward the teeth, and lowest when the brush head is rotated toward the user's lips and side wall of the oral cavity. For any short duration of time, there is effectively a constant DC pressure applied with an AC fluctuation on top which contains the angle information.

Figure 4:
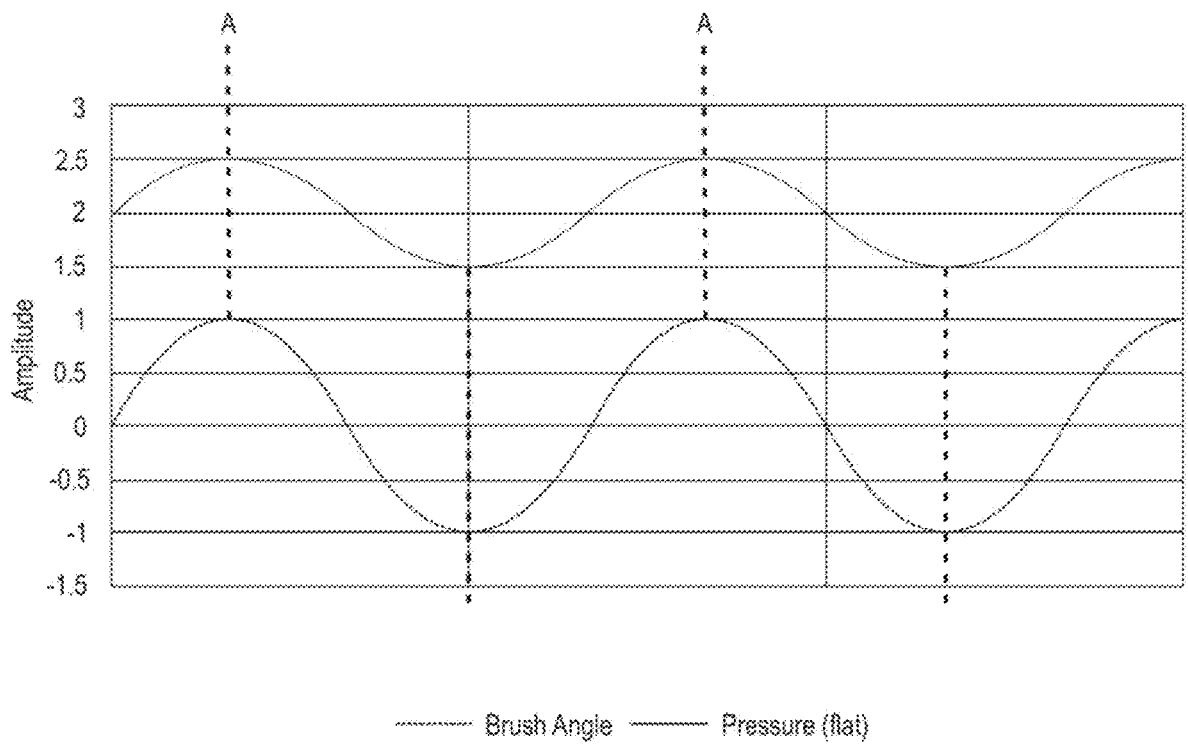
FIG. 4 is a graph depicting pressure and brush angle of oral care device with a brush head oriented at a 45° angle according to the present disclosure.

FIG. 4 is graph depicting pressure and brush angle (relative to the center of rotation) of oral care device with a brush head oriented at a 45° angle relative to the gum line of a user. As shown by points A and B, the frequency of the drive signal and frequency of the pressure signal are synchronized. At points A, pressure is high when the brush head is in most contact with the user's teeth. At points B, pressure is low when the brush head is in least contact with the teeth.

Figure 5:
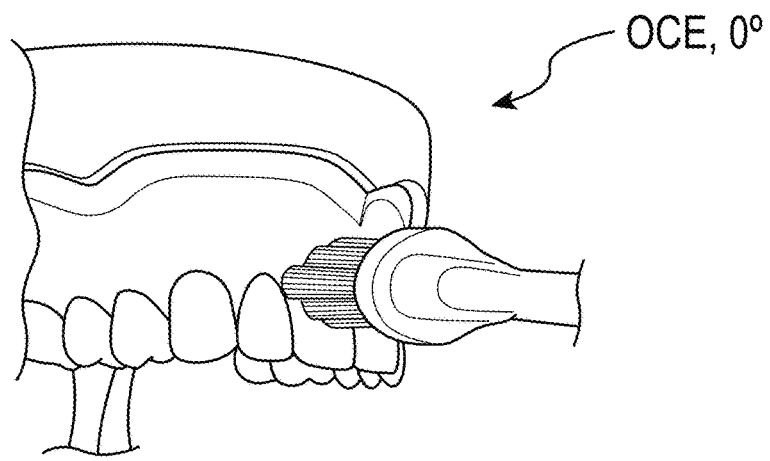
FIG. 5 is a photograph of an oral cavity environment with a brush head oriented at a 0° angle relative to the gum line of the oral cavity.

In a second example scenario, the brush head is oriented as shown in FIG. 5 at the center of rotation (same position it would be in if the oral care device was off). When the oral care device is operational for any short duration of time, there is effectively a constant DC pressure applied with an AC fluctuation on top which contains the angle information. In this case, the pressure is highest at the center of brush head position, and is reduced when the brush rotates in opposite directions. The result in this case is a quarter cycle offset between the peak in pressure and peak in brush angle. Further, there is a doubling of AC pressure fluctuation frequency with respect to driven signal.

Figure 6:
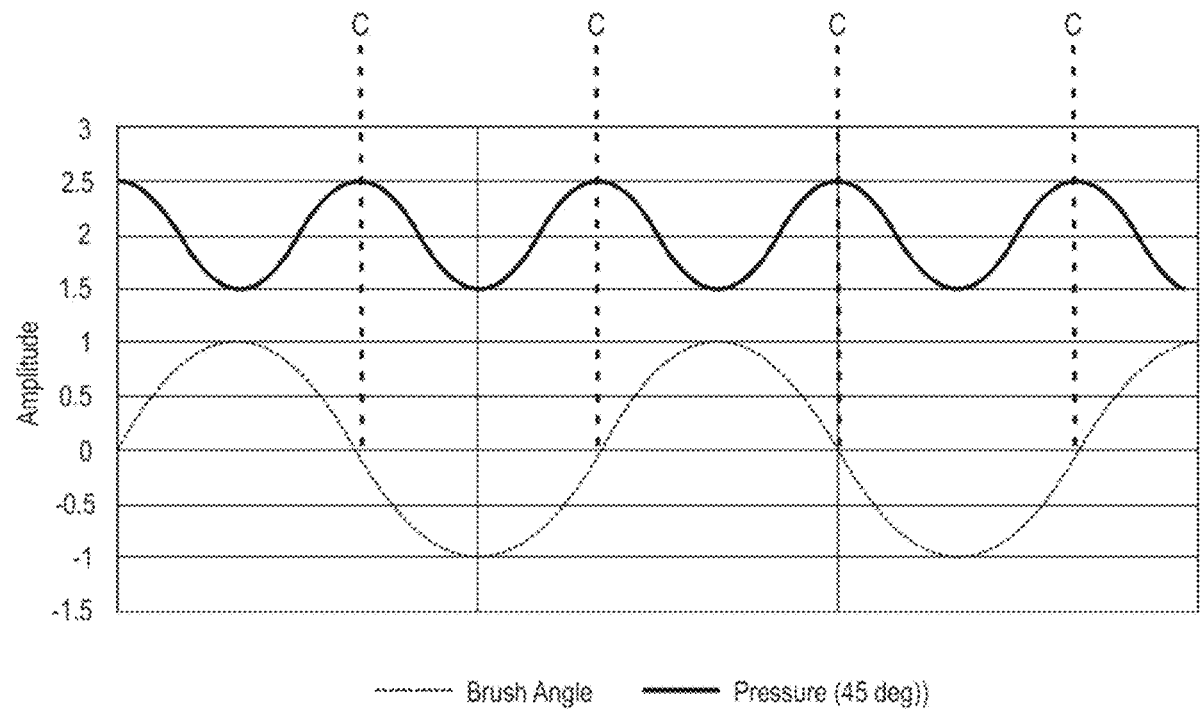
FIG. 6 is a graph depicting pressure and brush angle of oral care device with a brush head oriented at a 0° angle according to the present disclosure.

FIG. 6 is a graph depicting pressure and brush angle (relative to the center of rotation) of oral care device with a brush head oriented at a 0° angle relative to the gum line of a user. As shown by points C, the pressure peaks when the brush is at zero amplitude.

Figure 7:
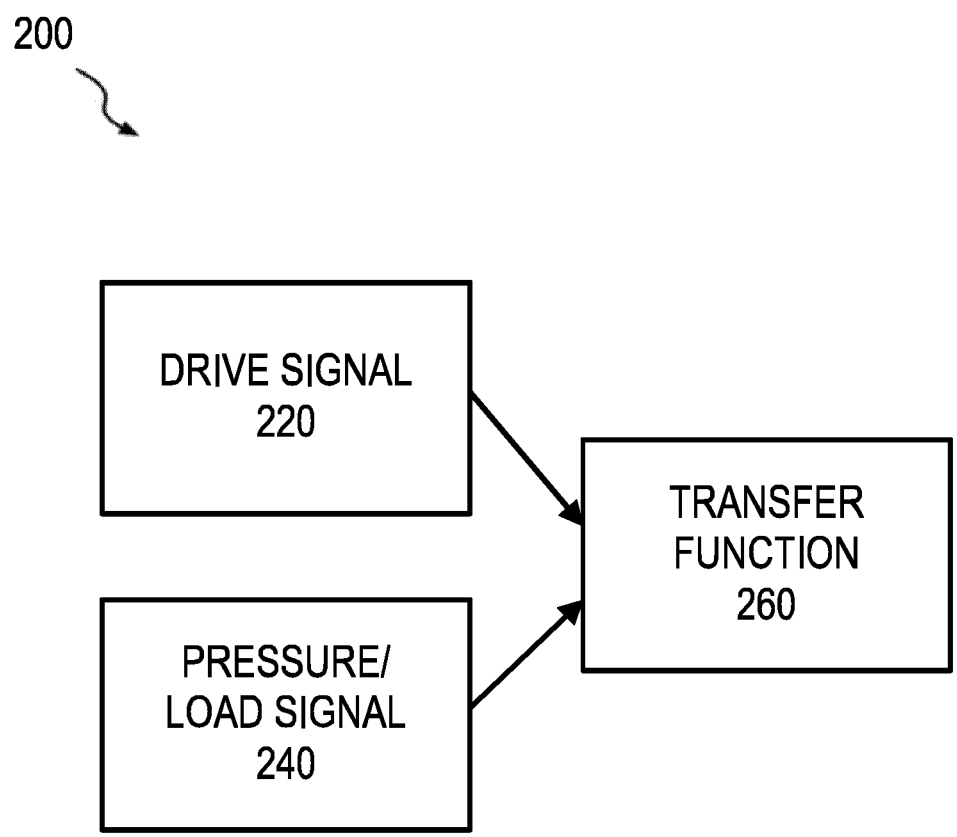
FIG. 7 is a flowchart of a method for determining a brushing angle of an oral care device according to the present disclosure.

By leveraging the characteristics of the measured force (e.g., amplitude, frequency, phase) and the characteristics of the drive signal (e.g., amplitude, frequency, phase), the brushing angle of the brush head relative to a surface of a user's oral cavity can be identified. As shown in FIG. 7, drive signal 220 and pressure/load signal 240 are inputs to a transfer function 260 which outputs brushing angle. The transfer function can be based on many characteristics of the input signals, including, for example, a change in the phase difference between the input signals, or a change of spectral energy density between the input signals.

The phase difference between the load and driven signal is one characteristic that may be used to determine brushing angle. At a 45° brush orientation (relative to a surface in the oral cavity), the phase angle difference is zero. As the brush orientation approaches 0°, the phase difference between the load and drive signal approaches a quarter cycle difference. The precise form of this relationship is dependent on the motion converter in the oral care device and properties of the brush head (e.g., tuft layout or bristle stiffness). To account for this variation, a calibration function can be developed for each relevant system configuration (e.g., motion converter and brush head paring) to translate the observed phase difference to brushing angle.

The spectral energy density of the load and drive signal is another characteristic that may be used to determine brushing angle. In this approach, the change in AC load frequency can be leveraged to identify the brushing angle. To resolve these conditions, the spectral energy density of each signal can be estimated by methods such as a Fast Fourier Transform (FFT), and then quantified by evaluating particular metrics. An example metric for this scenario is the ratio of energy ($A_1$) of the driven frequency ($f_1$) to that of the energy ($A_2$) of the first over-tone ($f_2=2f_1$) in the load signal. When the oral care device is oriented at 45° (relative to a surface in the oral cavity), the frequency of load is concentrated in the same frequency as driving signal, in this condition, $A_1>A_2$. This is in contrast with the time-varying component of load being concentrated in a frequency twice that of the driven frequency, when the end effector is orientated at 0° (relative to a surface in the oral cavity), in this condition, $A_1<A_2$. The precise form of the relationship is dependent on the motion converter in the oral care device and properties of the brush head (e.g., tuft layout or bristle stiffness). To resolve this variation, a calibration function can be developed for each relevant system configuration (e.g., motion converter and brush head paring) to translate the observed spectral energy density ratio ($A_1:A_2$) to brushing angle.

Referring to FIG. 8, in one embodiment, is a flowchart of a method 300 for determining a brushing angle of an oral care device 10. The oral care device can be any of the devices described or otherwise envisioned herein. In step 310, a drive signal is generated by controller 30 of oral care device 10 to move drive train 24 and produce a motion of bristle field 18 of oral care device 10. As discussed herein, the drive signal may be a square wave, for example, which in one cycle rises from a zero level to a positive value and after a time determined by the drive frequency declines to a value of opposing polarity, which drive signal cycle continues for the duration of operation of the toothbrush for each event.

In step 320, the force applied by a user to bristle field 18 of oral care device 10 is measured by sensor 28. Sensor 28 can be any of the sensors described or otherwise envisioned herein, for example, a load or pressure sensor, and can be programmed and/or configured to obtain sensor data regarding one or more aspects of load or force applied by the user to the brush head member 14, brush head 16, and/or bristle field 18 during a brushing session.

In step 330, a brushing angle of the bristle field relative to a surface of the user's oral cavity is determined, by controller 30 of oral care device 10, based at least in part on the generated drive signal and the measured force to bristle field 18. As described herein, the controller 30 can determine the brushing angle using a transfer function, such as a phase or frequency difference, by applying characteristics of the drive signal (e.g., amplitude, frequency, phase) and characteristics of the measured force (e.g., amplitude, frequency, phase).

In optional step 340, feedback is generated regarding the determined brushing angle. In optional step 350, the generated feedback is communicated to a user, a device, and/or another individual. The feedback can be real-time feedback, or can be feedback regarding one or more cleaning sessions. According to an embodiment, the feedback is provided to the user via a smartphone, a computer program, a base station, a remote software service, or via other means. Feedback generated by oral care device 10, control system 100, and/or a remote device can be provided to the user in any of a variety of different ways, including via visual, written, audible, haptic, or other types of feedback. According to another embodiment, the feedback is provided directly to a healthcare professional such as a dentist or dental hygienist. For example, information about one or more brushing sessions can be stored and transmitted to a healthcare professional automatically or upon request. According to an embodiment, the information can be stored on the user's smartphone and then brought to the dentist's office during a visit, where the information is automatically uploaded via a Bluetooth connection. The dentist can then review the feedback and utilize that information during care. In addition to these feedback mechanisms, many other mechanisms are possible. For example, the feedback can combine brushing angle into a display, report, or even a single value, among other types of feedback.

In optional step 360, the user is provided with a feedback notification when the determined brushing angle is less than a first predetermined threshold (e.g., 30° or 35°) or greater than a second predetermined threshold (e.g., 55° or 60°). It should be appreciated that the lower and upper brushing angle predetermined thresholds can be adjusted to any value.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A method for determining a brushing angle of an oral care device, the method comprising the steps of:
   generating, by a controller of the oral care device, a drive signal to move a drive train and produce a motion of a bristle field of the oral care device;
   measuring, via a sensor, force applied by a user to the bristle field of the oral care device; and
   determining, by the controller of the oral care device, a brushing angle of the bristle field relative to a surface of the user's oral cavity based at least in part on the generated drive signal and the measured force to the bristle field at least by applying characteristics of the measured force and characteristics of the generated drive signal via a transfer function;

wherein the characteristics of the measured force include an amplitude, frequency. and/or phase of the measured force, and the characteristics of the generated drive signal include an amplitude, frequency, and/or phase of the generated drive signal.

2. The method of claim 1, wherein the transfer function is based on a change in phase difference.

3. The method of claim 1, wherein the transfer function is based on a change in spectral energy density.

4. The method of claim 1, further comprising the step of generating a feedback regarding the determined brushing angle of the bristle field relative to the surface of the user's oral cavity.

5. The method of claim 4, further comprising the step of communicating the generated feedback.

6. The method of claim 5, wherein the generated feedback is communicated to the user as part of a guided cleaning session in real time and comprises, or is associated with, the determined brushing angle of the oral care device relative to the user's gum line.

7. The method of claim 5, wherein the generated feedback is communicated to the user visually, haptically, and/or audibly.

8. The method of claim 5, wherein the generated feedback is communicated to a remote device.

9. The method of claim 1, further comprising the step of notifying the user when the determined brushing angle of the oral care device is less than a first predetermined threshold or greater than a second predetermined threshold.

10. The method of claim 1, wherein the sensor comprises a load sensor.

11. The method of claim 1, wherein the sensor comprises a pressure sensor.

12. An oral care device, the device comprising:
a brush head including a bristle field;
a drive train responsive to a drive signal and configured to produce a motion of the bristle field;
a sensor configured to measure force applied by a user to the bristle field; and
a controller configured to: (i) generate a drive signal to move the drive train and produce a motion of the bristle field; and (ii) determine a brushing angle of the bristle field relative to a surface of the user's oral cavity based at least in part on the generated drive signal and the measured force to the bristle field, wherein the controller is further configured to apply characteristics of the measured force and characteristics of the generated drive signal via a transfer function;
wherein the characteristics of the measured force include an amplitude, frequency. and/or phase of the measured force, and the characteristics of the generated drive signal include an amplitude, frequency, and/or phase of the generated drive signal.

13. The oral care device of claim 12, wherein the transfer function is based on a change in phase difference.

14. The oral care device of claim 12, wherein the transfer function is based on a change in spectral energy density.

15. The oral care device of claim 12, wherein the controller is further configured to generate a feedback regarding the determined brushing angle of the bristle field relative to the surface of the user's oral cavity.

16. The oral care device of claim 15, wherein the controller is further configured to communicate the generated feedback.

17. The oral care device of claim 15, further comprising a user interface for communicating the generated feedback to the user visually, haptically, and/or audibly.

18. The oral care device of claim 12, wherein the sensor comprises a load sensor.

19. The oral care device of claim 12, wherein the sensor comprises a pressure sensor.

* * * * *